US012757088B2

(12) United States Patent
Yang

(10) Patent No.: US 12,757,088 B2
(45) Date of Patent: Oct. 6, 2026

(54) RELAY USER EQUIPMENT HANDOVER METHOD AND APPARATUS, AND DEVICE AND READABLE STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 206 days.

(21) Appl. No.: 18/294,906

(22) PCT Filed: Aug. 5, 2021

(86) PCT No.: PCT/CN2021/110818
§ 371 (c)(1),
(2) Date: Feb. 2, 2024

(87) PCT Pub. No.: WO2023/010400
PCT Pub. Date: Feb. 9, 2023

(65) Prior Publication Data
US 2024/0349148 A1 Oct. 17, 2024

(51) Int. Cl.
*H04W 36/08* (2009.01)
*H04W 40/22* (2009.01)

(52) U.S. Cl.
CPC ......... *H04W 36/083* (2023.05); *H04W 40/22* (2013.01)

(58) Field of Classification Search
CPC ............................ H04W 40/22; H04W 36/083
(Continued)

(56) References Cited

U.S. PATENT DOCUMENTS 8,462,734 B2 * 6/2013 Laine ................ H04M 1/72412 370/252
10,516,986 B2 12/2019 Lee et al.
(Continued)

FOREIGN PATENT DOCUMENTS

CN 105657643 A 6/2016
CN 106888494 A 6/2017

OTHER PUBLICATIONS

Manolakis, et. al., Sidelink-Assisted Handover for Cellular Networks (Year: 2017).*
(Continued)

*Primary Examiner* — Peter G Solinsky
(74) *Attorney, Agent, or Firm* — Finnegan, Henderson, Farabow, Garrett & Dunner, L.L.P.

(57) ABSTRACT

Provided in the present disclosure are a relay UE handover method and apparatus, and a communication device and a readable storage medium, which are applied to the terminal field of wireless communications. The relay UE handover method comprises: on the basis of a serving cell of a target relay UE, determining whether to hand over to the target relay UE. In the present disclosure, when a remote UE learns that same is required to hand over to a target relay UE, it is determined, on the basis of a serving cell of a remote target relay UE, whether to hand over to the target relay UE. That is to say, the serving cell of the target relay UE is taken as a reference parameter for handover. Therefore, the failure of remote UE handover caused by changing of the serving cell of the relay UE can be avoided, thereby improving the stability of a wireless communication system.

20 Claims, 4 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 11,259,350 | B1 * | 2/2022 | Pan | H04W 88/04 |
| 11,271,699 | B1 * | 3/2022 | Eyuboglu | H04J 11/0073 |
| 11,792,701 | B2 * | 10/2023 | Szilagyi | H04W 36/0058 370/331 |
| 2013/0170347 | A1 * | 7/2013 | Zhang | H04W 76/18 370/331 |
| 2013/0230024 | A1 * | 9/2013 | Lim | H04W 36/125 370/331 |
| 2014/0204834 | A1 * | 7/2014 | Singh | H04W 36/00 370/315 |
| 2015/0249946 | A1 * | 9/2015 | Oh | H04W 36/035 370/331 |
| 2016/0150443 | A1 * | 5/2016 | Suryavanshi | H04W 36/035 370/331 |
| 2018/0343598 | A1 | 11/2018 | Xu et al. | |
| 2019/0357114 | A1 * | 11/2019 | Martin | H04W 8/005 |
| 2021/0029529 | A1 | 1/2021 | Wu et al. | |
| 2023/0105318 | A1 * | 4/2023 | Agiwal | H04W 36/0055 370/331 |
| 2023/0109689 | A1 * | 4/2023 | Chang | H04W 36/0009 370/331 |
| 2023/0156536 | A1 * | 5/2023 | Kumar | H04W 36/0058 370/331 |
| 2023/0189087 | A1 * | 6/2023 | Lu | H04W 36/033 370/331 |
| 2023/0300681 | A1 * | 9/2023 | Liu | H04W 36/38 370/331 |

OTHER PUBLICATIONS

ISA State Intellectual Property Office of the People's Republic of China, Written Opinion of the International Searching Authority Issued in Application No. PCT/CN2021/110818, Apr. 28, 2022, WIPO, 8 pages.

"Relay UE selection in coverage", Ericsson, 3GPP TSG-RAN WG2 #91, Tdoc R2-152481, Beijing, P.R. China, Aug. 24-28, 2015, 9 pages.

Office Action issued by the Patent Office of the Russian Federation Federal Institute of Industrial Property on Aug. 26, 2024, in corresponding Application No. RU 2024105364, 10 pages.

Extended European Search Report Issued in Application No. 21952295.0 dated Sep. 9, 2024, 28 pages.

"Path switch procedure from cellular link to relay link", Huawei, HiSillcon, Discussion and Decision, 3GPP TSG-RAN WG2 Meeting #bis , R2-1703473, Online, Apr. 3-7, 2017, 7 pages.

Notice of Reasons for Refusal issued by the Japanese Patent Office on Jan. 7, 2025, in corresponding Application No. 2024-507034, 10 pages.

Office Action issued by the Korean Intellectual Property Office on Jul. 14, 2026, in corresponding Korean Application No. KR 10-2024-7007397, 15 pages.

"Summary of AI 8.7.3 (relay selection/reselection)", Qualcomm Incorporated 3GPP TSG RAN WG2 Meeting #113-bis-e, R2-2104287, E-Conference, Apr. 12-20, 2021, 16 pages.

"Relay selection and reselection", InterDigital Inc., 3GPP RAN WG2 Meeting #113bis-electronic, R2-2102807, Online, Apr. 2021, 2 pages.

"Discussion on NR sidelink relay UE (re-)selection", OPPO, 3GPP TSG-RAN WG2 Meeting #113 bis electronic, R2-2103007, Online, Apr. 12-20, 2021, 5 pages.

"Role of eNB when remote UE is in coverage", Qualcomm Incorporated, 3GPP TSG-RAN WG2 Meeting #90, R2-152560, Fukuoka, Japan, May 25-29, 2015, 5 pages.

"Exit condition for condictional handover", Intel Corporation, 3GPP TSG RAN WG2 Meeting #106, R2-1906294, Reno, USA, May 13-17, 2019, 5 pages.

* cited by examiner

RELAY USER EQUIPMENT HANDOVER METHOD AND APPARATUS, AND DEVICE AND READABLE STORAGE MEDIUM

CROSS-REFERENCE TO RELATED APPLICATION

This application is a U.S. national phase application of International Application No. PCT/CN2021/110818, filed on Aug. 5, 2021, the content of which is hereby incorporated by reference in its entirety.

TECHNICAL FIELD

The disclosure relates to the field of wireless communication technologies, and in particular, to a method and a device for handing over to a relay user equipment (UE), a communication device, and a readable storage medium.

BACKGROUND

In related arts, in order to support direct communication between user equipment (UEs), sidelink communication is introduced. The sidelink may support following three transmission modes: unicast, multicast, and broadcast.

When two UEs perform the sidelink communication, one of the UEs may not be directly connected to the base station, but through another UE that may be used as a relay to realize connection and communication with the base station. The UE providing the relay function is relay UE and the UE connected to the base station through the relay UE is remote UE. The relay UE communicates with the remote UE through the sidelink.

SUMMARY

According to a first aspect of embodiments of the disclosure, a method for handing over to a relay UE is provided. The method is performed by a remote UE. The method includes:

determining whether to hand over to a target relay UE based on a serving cell of the target relay UE.

According to a second aspect of embodiments of the disclosure, a method for handing over to a relay UE is provided. The method is performed by a network device. The method includes:

receiving, from a remote UE, information for indicating that a target relay UE is not handed over to.

According to a third aspect of embodiments of the disclosure, a communication device is provided. The communication device includes:

a processor; and a memory, for storing processor-executable instructions;

in which, the processor is configured to determine whether to hand over to a target relay UE based on a serving cell of the target relay UE.

BRIEF DESCRIPTION OF THE DRAWINGS

The drawings described here are used to provide a further understanding of embodiments of the disclosure, and constitute a part of the disclosure. Schematic embodiments of embodiments of the disclosure and their descriptions are used to explain embodiments of the disclosure, and do not constitute an undue limitation to embodiments of the disclosure.

The accompanying drawings, which are incorporated in and constitute a part of this specification, illustrate embodiments consistent with embodiments of the disclosure, and together with the description serve to explain the principles of embodiments of the disclosure.

DETAILED DESCRIPTION

Embodiments of the disclosure will now be further described in conjunction with the accompanying drawings and specific implementation methods.

Reference will now be made in detail to embodiments, examples of which are illustrated in the accompanying drawings. When the following description refers to the accompanying drawings, the same numerals in different drawings refer to the same or similar elements unless otherwise indicated. The implementations described in following embodiments do not represent all implementations consistent with embodiments of the disclosure. Rather, they are merely examples of devices and methods consistent with aspects of the disclosure as recited in the appended claims.

Terms used in embodiments of the disclosure are for the purpose of describing specific embodiments only, and are not intended to limit embodiments of the disclosure. As used in the examples of this disclosure and the appended claims, the singular forms "a" and "the" are also intended to include the plural unless the context clearly dictates otherwise. It is understandable that the term "and/or" as used herein refers to and includes any and all possible combinations of one or more of the associated listed items.

It is understandable that although embodiments of the disclosure may use the terms first, second, third, etc. to describe various information, the information should not be limited to these terms. These terms are only used to distinguish information of the same type from one another. For example, without departing from the scope of embodiments of the disclosure, first information may also be called second information, and similarly, second information may also be called first information. Depending on the context, the word "if" as used herein may be interpreted as "at" or "when" or "in response to determining."

Figure 1:
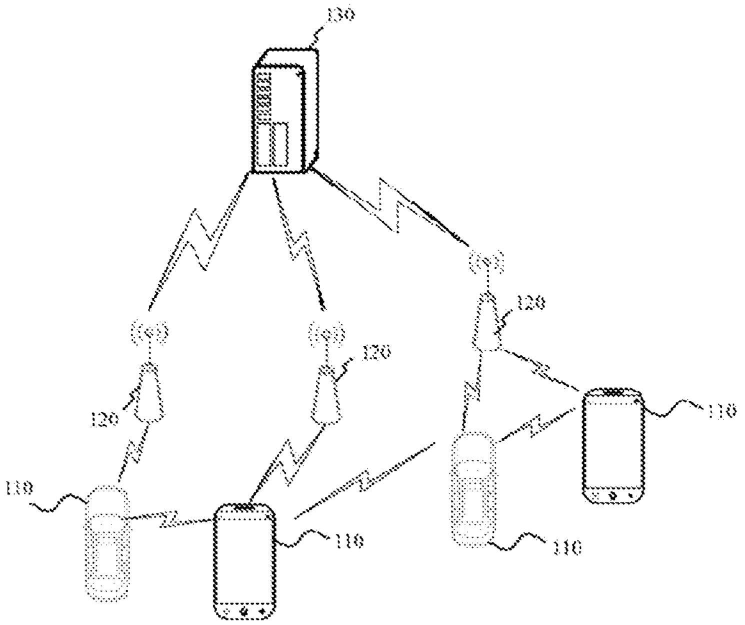
FIG. 1 is a schematic diagram illustrating a wireless communication system according to an embodiment.

FIG. 1 is a schematic diagram illustrating a wireless communication system according to an embodiment of the disclosure. As illustrated in FIG. 1, the wireless communication system is a communication system based on cellular mobile communication technology, and the wireless communication system may include several user equipment (UEs) 110 and several base stations 120.

The UE 110 may be a device for providing voice and/or data connectivity to the user. The UE 110 may communicate with one or more core networks via a radio access network (RAN), and the UE 110 can be an Internet of Things (IoT) UE, such as a sensor device or a mobile phone (or called a "cellular" phone), or a computer with IoT UE, such as a fixed, portable, pocket, hand-held, built-in computer or a vehicle-mounted device. For example, station (STA), subscriber unit, subscriber station, mobile station, mobile, remote station, access point, remote terminal, access terminal, user terminal, user agent, user device (user device), or UE. Or, the UE 110 may be a device of an unmanned aerial vehicle. Or, the UE 110 may be a vehicle-mounted device, such as a trip computer with a wireless communication function, or a wireless user device connected externally to the trip computer. Or, the UE 110 may be a roadside device, such as a street lamp, a signal lamp, or other roadside devices with a wireless communication function.

The base station 120 may be a network side device in a wireless communication system. The wireless communication system may be a fourth generation (4G) mobile communication technology system, also known as a Long Term Evolution (LTE) system. Or, the wireless communication system may be a 5G system, also known as new radio system or 5G NR system. Or, the wireless communication system may be a next-generation system of the 5G system. The access network in the 5G system may be called a new generation-radio access network (NG-RAN).

The base station 120 may be an evolved base station (eNB) adopted in a 4G system. Or, the base station 120 may be a base station (gNB) adopting a centralized-distributed architecture in the 5G system. When adopting the centralized-distributed architecture, the base station 120 generally includes a central unit (CU) and at least two distributed units (DUs). The central unit is provided with a protocol stack of a Packet Data Convergence Protocol (PDCP) layer, a Radio Link Control (RLC) layer, and a Medium Access Control (MAC) layer. A physical (PHY) layer protocol stack is set in the DU. Embodiments of the disclosure do not limit a specific implementation manner of the base station 120.

A wireless connection may be established between the base station 120 and the UE 110 through a wireless air interface. In different embodiments, the wireless air interface is a wireless air interface based on the 4G mobile communication network technology standard; or the wireless air interface is a wireless air interface based on the 4G mobile communication network technology standard, such as a new radio. Or, the wireless air interface may be a wireless air interface based on a next-generation mobile communication network technology standard of the 5G.

In some embodiments, an End to End (E2E) connection may also be established between UEs 110, such as in a vehicle-to-vehicle (V2V) communication scene, a vehicle-to-infrastructure (V2I) communication scene or a vehicle-to-pedestrian (V2P) communication scene in the vehicle-to-everything (V2X) communication.

Here, the above UE may be regarded as the terminal device in e following embodiments.

In some embodiments, the foregoing wireless communication system may further include a network management device 130.

Each of several base stations 120 is connected to the network management device 130. The network management device 130 may be a core network device in a wireless communication system. For example, the network management device 130 may be a Mobility Management Entity (MME). Or, the network management device may be other core network devices, such as a Serving GateWay (SGW), a Public Data Network GateWay (PGW), a Policy and Charging Rules Function (PCRF) or a Home Subscriber Server (HSS). The implementation form of the network management device 130 is not limited in embodiments of the disclosure.

In one embodiment, when a remote UE performs a handover of a relay UE while moving between base stations, service discontinuity will be caused, so the remote UE cannot perform a handover operation during the process of moving between base stations. The base station selects a suitable relay UE based on the measurement report reported by the remote UE, and carries the identifier of the selected relay UE in a handover command sent to the remote UE. However, after the remote UE sends the measurement report, the relay UE may change its serving cell. When the remote UE receives the handover command, if the serving cell of the relay UE changes (for example, changes to a cell of a base station other than the base station to which the remote UE belongs), the handover failure will be caused.

Figure 2:
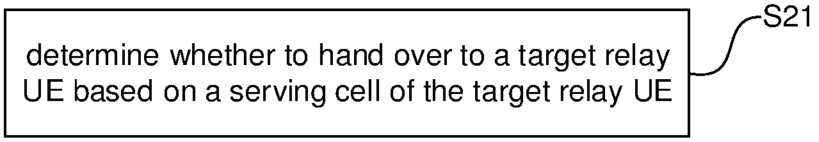
FIG. 2 is a flowchart illustrating a method for handing over to a relay user equipment (UE) according to an embodiment.

In order to solve the problem of the handover failure of the remote UE caused by the change of the serving cell of the relay UE, embodiments of the disclosure provide a method for handing over to a relay UE, which is performed by the remote UE. FIG. 2 is a flowchart illustrating a method for handing over to a relay UE according to an embodiment. As illustrated in FIG. 2, the method for handing over to a relay UE includes the following.

At block S21, it is determined whether to hand over to a target relay UE based on a serving cell of a target relay UE.

Rach of the remote UE and the relay UE in embodiments of the disclosure may be any type of UE. For example, the remote UE and the relay UE may each be a mobile phone, a smart terminal, a computer, a server, a transceiver device, a tablet device, or a medical device. Or, the remote UE and the relay UE may each be a game console, a multimedia device, or a wearable device. The remote UE and the relay UE are not limited as long as they may communicate through a sidelink (SL) connection.

In a wireless communication system, the relay UE is a UE that provides a relay function, and the remote UE is a UE connected to a base station through the relay UE.

The base station here is an interface device for the UE to access the Internet. The base station can be various types of base stations, such as 3G base stations, 4G base stations, 5G base stations or other evolved base stations. The base station may also be a terrestrial network base station or a non-terrestrial network base station.

In an embodiment, before the block S21, the method further includes: receiving, by the remote UE, a discovery signal from the relay UE, and acquiring, by the remote UE an identifier of a serving cell of the relay UE from the discovery signal.

The relay UE and the remote UE send discovery signals to each other, and discover each other through the discovery signals. The discovery signal sent by the relay UE carries the identifier of the serving cell of the relay UE.

In one embodiment, the block S21 is performed when the remote UE knows that there is a need to hand over to a target relay UE.

There are two ways for the remote UE to know that there is a need to hand over to the target relay UE Way 1: A handover command sent by the base station for instructing the remote UE to hand over to the target relay UE is received.

Way 2: The remote UE detects that a handover condition is met.

The Way 2 is applicable to a case where the base station configures an automatic handover mechanism for the remote UE. That is, the base station configures an automatic handover mechanism for the remote UE, that is, the base station sends the handover condition and the handover command corresponding to the target relay UE to the remote UE, and the remote UE detects in real time whether the handover condition is met.

In an embodiment, after receiving the handover command sent by the base station for instructing the remote UE to hand over to the target relay UE, the block S21 is performed.

In one embodiment, when the remote UE detects that the handover condition is met, the block S21 is performed.

The block S21 further includes: when it is determined, based on the serving cell of the remote target relay UE, that the handover to the target relay UE is required, initiating the handover to the target relay UE. Or, the block S21 further includes: not initiating the handover to the target relay UE when determining, based on the serving cell of the target relay UE, not to hand over to the target relay UE.

In embodiment of the disclosure, when the remote UE knows that there is a need to hand over to the target relay UE, the remote UE determines, based on the serving cell of the target relay UE, whether to hand over to the target relay UE. That is, the serving cell of the target relay UE is used as a reference parameter for determining whether to perform the handover, to avoid the handover failure for the remote UE caused by the change of the serving cell of the relay UE, thereby improving the stability of the wireless communication system.

Figure 3:
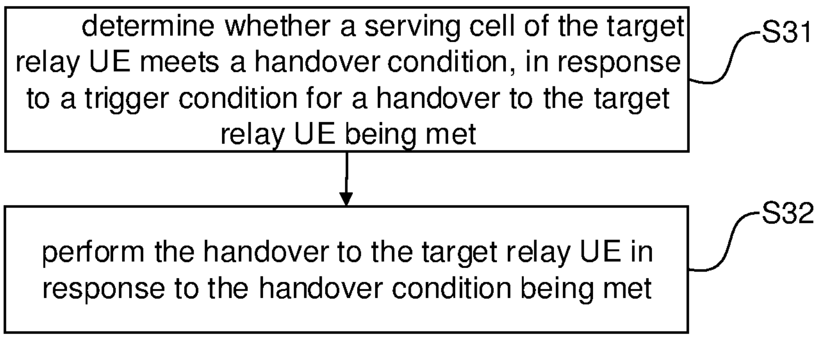
FIG. 3 is a flowchart illustrating a method for handing over to a relay UE according to an embodiment.

Embodiments of the disclosure provide a method for handing over to a relay UE, and the method is performed by a remote UE. FIG. 3 is a flowchart illustrating a method for handing over to a relay UE according to an embodiment. As illustrated in FIG. 3, the method for handing over to a relay UE includes the following.

At block S31, it is determined whether a serving cell of the target relay UE meets a handover condition, in response to a trigger condition for a handover to the target relay UE being met.

At block S32, the handover to the target relay UE is performed in response to the handover condition being met.

Or, the handover to the target relay UE is not performed, in response to the handover condition not being met.

Or, performing the handover to the target relay UE is prohibited in response to the handover condition not being met.

In an embodiment, the trigger condition for the handover to the target relay UE in the block S31 includes at least one of the following.

A handover command sent by the base station for instructing the remote UE to hand over to the target relay UE is received; or

- determining, based on a parameter of a sidelink between the remote UE and the target relay UE, that a preset condition for handing over to the target relay UE is met.

In an example, the handover command is a reconfiguration message sent by the base station, and the reconfiguration message includes indication information for instructing the remote UE to perform the handover to the target relay UE.

In an example, the parameter of the sidelink between the remote UE and the target relay UE includes: channel quality of the sidelink between the remote UE and the target relay UE.

The preset condition for handing over to the target relay UE includes: the channel quality of the sidelink between the remote UE and the target relay UE being greater than a preset threshold.

In one embodiment, in the block S31 that the serving cell of the target relay UE meets the handover condition, the handover condition includes at least one of:

- the serving cell of the target relay UE being same as a serving cell of the remote UE;
- the serving cell of the target relay UE being same as a reported serving cell of the target relay UE that has been reported by the remote UE to the base station; or
- the serving cell of the target relay UE belonging to a cell list.

In an example, the remote UE stores the reported serving cell of the target relay UE that has been reported to the base station.

In an example, before the block S31, the method further includes: receiving the cell list from the base station. The cell list corresponds to the target relay UE, and different target relay UEs correspond to different cell lists. The cell list includes one or more cells.

In embodiment of the disclosure, a trigger condition for the handover to the target relay UE is set for the remote UE, and when the trigger condition for the handover to the target relay UE is satisfied, it is determined whether the serving cell of the target relay UE meets the handover condition. The handover to the target relay UE is performed only when the handover condition is met, to avoid the handover failure of the remote UE caused by the change of the serving cell of the relay UE, thereby improving the stability of the wireless communication system.

Embodiments of the disclosure provide a method for handing over to a relay UE. The method is performed by a remote UE. The method for handing over to the relay UE includes the following.

At block S1-1, the handover to the target relay UE is not performed, based on a determination that the serving cell of the target relay UE does not meet a handover condition in response to a trigger condition for a handover to the target relay UE being met.

At block S2-1, information for indicating that the remote UE does not perform the handover to the target relay UE is sent to the base station.

In an embodiment, the information for indicating that the handover to the target relay UE is not performed includes at least one of: an identifier of the target relay UE, or an identifier of the serving cell of the target relay UE.

In embodiments of the disclosure, the trigger condition for the handover to the target relay UE is set for the remote UE. When the trigger condition for the handover to the target relay UE is satisfied, it is determined whether the serving cell of the target relay UE meets the handover condition. When the handover condition is not met, the handover to the target relay UE is not performed and the information for indicating that the target relay UE is not handed over to is sent to the base station, so that the base station may know in time the state that the remote UE does not hand over to the target relay UE, so that the base station performs reasonable subsequent control operations based on this state.

Embodiments of the disclosure provide a method for handing over to a relay UE. The method is performed by a remote UE. The method for handing over to the relay UE includes the following.

In block S1, the handover to the target relay UE is not performed based on a determination that the serving cell of the target relay UE does not meet a handover condition in response to a trigger condition for a handover to the target relay UE being met.

In block S2, information for indicating that the target relay UE is not handed over to is sent to the base station.

In block S3, another handover command for instructing to hand over to another relay UE other than the target relay UE is received from the base station.

In an embodiment, the information for indicating that the target relay UE is not handed over to includes at least one of: an identifier of the target relay UE or an identifier of the serving cell of the target relay UE.

In embodiments of the disclosure, the trigger condition for the handover to the target relay UE is set for the remote UE. When the trigger condition for handover to the target relay UE is met, it is determined whether the serving cell of the target relay UE meets the handover condition. When the handover condition is not met, the handover to the target relay UE is not performed and the information for indicating that the target relay UE is not handed over to is sent the base station, so that the base station can know in time a state that the remote UE does not hand over to the target relay UE. Then the base station may reasonably allocate another relay UE to the remote UE based on this state and send a new handover command to the remote UE, so that the remote UE may hand over to the required relay UE.

Embodiments of the disclosure provide a method for handing over to a relay UE. The method is performed by a remote UE. The method for handing over to the relay UE includes the following.

At block S1, the handover to the target relay UE is not performed based on a determination that the serving cell of the target relay UE does not meet a handover condition in response to a trigger condition for a handover to the target relay UE being met.

At block S2, reestablishment of a radio resource control (RRC) link is sent to the target relay UE.

Embodiment of the present disclosure provide a method for handing over to a relay UE. The method is performed by a remote UE. The method for handing over to the relay UE includes the following.

At block S1, the handover to the target relay UE is not performed based on a determination that the serving cell of the target relay UE does not meet a handover condition in response to a trigger condition for a handover to the target relay UE being met.

At block S2, a re-establishment request of the radio resource control link is triggered.

Triggering the re-establishment request of the radio resource control link means triggering the remote UE to start the following process: initiating the reestablishment of the radio resource control (RRC) link to the target relay UE, or sending a trigger request to the target relay UE to trigger the target relay UE to start the following process: initiating the reestablishment of the radio resource control RRC link to the remote UE.

Embodiments of the disclosure provide a method for handing over to a relay UE. The method is performed by a remote UE. The method for handing over to the relay UE includes the following.

At block S1, the handover to the target relay UE is not performed based on a determination that the serving cell of the target relay UE does not meet a handover condition in response to a trigger condition for a handover to the target relay UE being met.

At block S2, at least one of the following is performed:
- deleting the handover command corresponding to the target relay UE, or deleting the preset condition for handing over to the target relay UE.

In embodiments of the disclosure, when the trigger condition for the handover to the target relay UE is met and it is determined that the serving cell of the target relay UE does not meet the handover condition, the handover to the target relay UE is not performed, and the relevant handover command and/or the preset condition for handing over to the target relay UE is deleted. That means abandoning the autonomous handover mechanism to the target relay UE for the remote UE and adopting the mechanism of sending the handover command by the base station.

Figure 4:
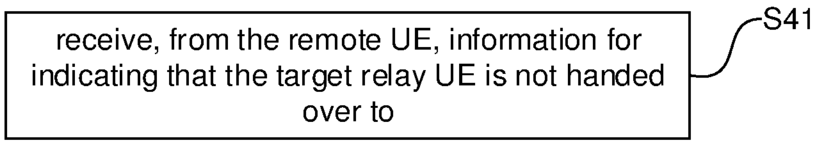
FIG. 4 is a flowchart illustrating a method for handing over to a relay UE according to an embodiment.

Embodiments of the disclosure provide a method for handing over to a relay UE. The method is performed by a network device. FIG. 4 is a flowchart illustrating a method for handing over to a relay UE according to an embodiment. As illustrated in FIG. 4, the method for handing over to a relay UE includes the following.

At block S41, information for indicating that the target relay UE is not handed over to is received from the remote UE.

In an embodiment, the information for indicating that the target relay UE is not handed over to is determined by the remote UE based on the serving cell of the target relay UE.

In an embodiment, the information indicating that the target relay UE is not handed over to is determined by the remote UE based on the serving cell of the target relay UE.

In an embodiment, the information for indicating that the target relay UE is not handed over to includes at least one of: an identifier of the target relay UE, or an identifier of a serving cell of the target relay UE.

In embodiments of the disclosure, when the remote UE knows that there is a need to hand over to a target relay UE, the remote UE determines whether to hand over to the target relay UE based on the serving cell of the remote target relay UE. That is, the serving cell of the target relay UE is used as a reference parameter for determining whether to perform the handover, so as to avoid the handover failure of the remote UE caused by the change of the serving cell of the relay UE and when the remote UE determines not to hand over to the target relay UE.

Figure 5:
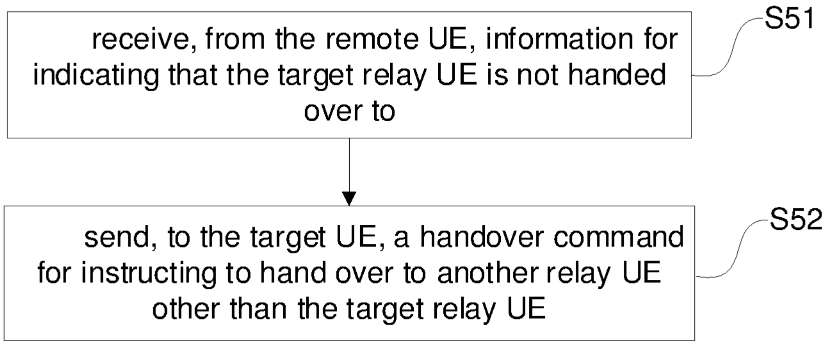
FIG. 5 is a flowchart illustrating a method for handing over to a relay UE according to an embodiment.

Embodiments of the disclosure provide a method for handing over to a relay UE. The method is performed by a network device. FIG. 5 is a flowchart illustrating a method for handing over to a relay UE according to an embodiment. As illustrated in FIG. 5, the method for handing over to a relay UE includes the following.

At block S51, the information sent by the remote UE for indicating that the target relay UE is not handed over to is received.

At block S52, a handover command for instructing to hand over to another relay UE other than the target relay UE is sent to the remote UE.

In an embodiment, the information for indicating that the target relay UE is not handed over to is determined by the remote UE based on the serving cell of the target relay UE.

In an embodiment, the information for indicating that the target relay UE is not handed over to is determined by the remote UE based on a determination that the serving cell of the target relay UE does not meet a handover condition in response to a trigger condition for a handover to the target relay UE being met.

Embodiments of the disclosure provide a method for handing over to a relay UE. The method is performed by a network device. This method include:

- sending a cell list to the remote UE, in which the cell list is used for enabling the remote UE to determine that the serving cell of the target relay UE meets the handover condition in response to the serving cell of the target relay UE belonging to the cell list and perform the handover to the target relay UE; and
- receiving information sent by the remote UE for indicating that the target relay UE is not handed over to.

In embodiments of the disclosure, the network device configures that the remote UE adopts an autonomous handover mechanism for autonomously determining whether to hand over to the target relay UE and receives the information for indicating that the target relay UE is not handed over to in response to determining by the remote UE that the handover condition is not met.

Embodiments of the disclosure provide a method for handing over to a relay UE. The method is performed by a network device. This method includes:

- receiving information sent by the remote UE for indicating that the target relay UE is not handed over to; and
- sending a handover command for instructing the remote UE to hand over to the target relay UE.

In embodiments of the disclosure, after receiving the information sent by the remote UE for indicating that the target relay UE is not handed over to, the network device determines to abandon the autonomous handover mechanism of handing over to the target relay UE for the remote UE and then adopt a mechanism that the base station sends the handover command for instructing the remote UE to hand over to the target relay UE to the remote UE, to enable the remote UE to successfully complete the handover.

Figure 6:
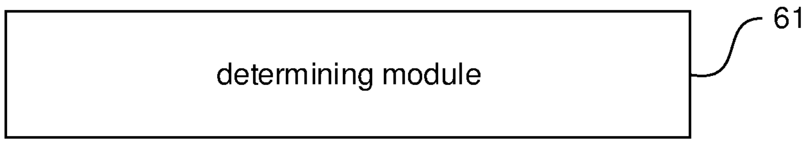
FIG. 6 is a block diagram illustrating a device for handing over to a relay UE according to an embodiment.

Embodiments of the disclosure provide a device for handing over to a relay UE. The device is applied to a remote UE. FIG. 6 is a block diagram illustrating a device for handing over to a relay UE according to an embodiment. As illustrating in FIG. 6, the device for handing over to a relay UE includes a determining module 61.

The determining module 61 is configured to determine whether to hand over to the target relay UE based on the serving cell of the target relay UE.

In one embodiment, the determining module 61 includes: a determining unit and a processing unit.

The determining unit is configured to determine whether the serving cell of the target relay UE meets a handover condition in response to a trigger condition for a handover to the target relay UE is met.

The processing unit is configured to perform the handover to the target relay UE in response to a handover condition being met.

In one embodiment, the processing unit is further configured to not perform the handover to the target relay UE in response to the handover condition not being met.

In an embodiment, the trigger condition for the handover to the target relay UE includes at least one of:

- receiving a handover command sent by the base station for instructing the remote UE to perform the handover to the target relay UE; and
- determining, based on a parameter of a sidelink between the remote UE and the target relay UE, that a preset condition for handing over to the target relay UE is met; in which the preset condition is received from the base station.

In an embodiment, the parameter of the sidelink between the remote UE and the target relay UE includes: channel quality of the sideink between the remote UE and the target relay UE.

The preset condition for handing over to the target relay UE includes: the channel quality of the sidelink between the remote UE and the target relay UE being greater than a preset threshold.

In an embodiment, the serving cell of the target relay UE meeting the handover condition includes at least one of:

- the serving cell of the target relay UE being same as a serving cell of the remote UE;
- the serving cell of the target relay UE being same as a reported serving cell of the target relay UE that has been reported by the remote UE to the base station; or
- the serving cell of the target relay UE belonging to a cell list.

In one embodiment, the device includes a receiving module.

The receiving module is configured to receive the cell list from a base station; in which the cell list corresponds to the target relay UE.

In one embodiment, the device includes a sending module.

The sending module is configured to perform one of:

- sending to the base station information for indicating that the remote UE does not hand over to the target relay UE; or
- initiating reestablishment of a radio resource control link to the target relay UE;

The processing module is configured to perform one of:

- triggering a re-establishment request of the radio resource control link;
- deleting the handover command corresponding to the target relay UE;
- deleting the preset condition for handing over to the target relay UE; or
- deleting the handover command corresponding to the target relay UE and the preset condition for handing over to the target relay UE.

In one embodiment, the device includes: a receiving module.

The receiving module is configured to receive, from the base station, a handover command for instructing to hand over to another relay UE other than the target relay UE.

Figure 7:
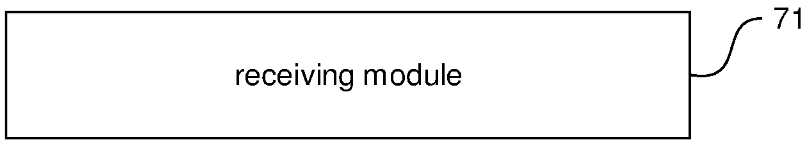
FIG. 7 is a block diagram illustrating a device for handing over to a relay UE according to an embodiment.

Embodiments of the disclosure provide a device for handing over to a relay UE. The device is applied to a network device. FIG. 7 is a block diagram illustrating a device for handing over to a relay UE according to an embodiment. As illustrated in FIG. 7, the device for handing over to a relay UE includes a receiving module 71.

The receiving module 71 is configured to receive information sent by the UE for indicating that the target relay UE is not handed over to.

In an embodiment, the information for indicating that the target relay UE is not handed over to is determined by the remote UE based on the serving cell of the target relay UE.

In an embodiment, the information for indicating that the target relay UE is not handed over to is determined by the remote UE based on a determination that the serving cell of the target relay UE does not meet a handover condition in response to a trigger condition for a handover to the target relay UE being met.

In one embodiment, the device also includes: a sending module.

The sending module is configured to send a cell list to the remote UE. The cell list is used for enabling the remote UE to determine that serving cell of the target relay UE meets the handover condition in response to the serving cell of the target relay UE belonging to the cell list and perform the handover to the target relay UE.

In one embodiment, the device also includes: a sending module.

The sending module is configured to send a handover command for instructing the remote UE to hand over to the target relay UE.

Embodiments of the disclosure provides a UE. The UE includes:

a processor; and a memory, for storing processor-executable instructions;

in which, the processor is configured to execute the executable instructions stored in the memory to perform the methods for handing over to a relay UE.

Embodiments of the disclosure provide a network device. The network device includes:

a processor; and a memory, for storing processor-executable instructions;

in which, the processor is configured to execute the executable instructions stored in the memory to perform the methods for handing over to a relay UE.

Embodiments of the disclosure provide a non-transitory computer-readable storage medium, having executable instructions stored thereon, in which the methods for handing over to a relay UE are performed when the executable instructions are executed by a processor.

Embodiments of the disclosure provide a non-transitory computer-readable storage medium, having executable instructions stored thereon, in which the methods for handing over to a relay UE are performed when the executable instructions are executed by a processor.

Figure 8:
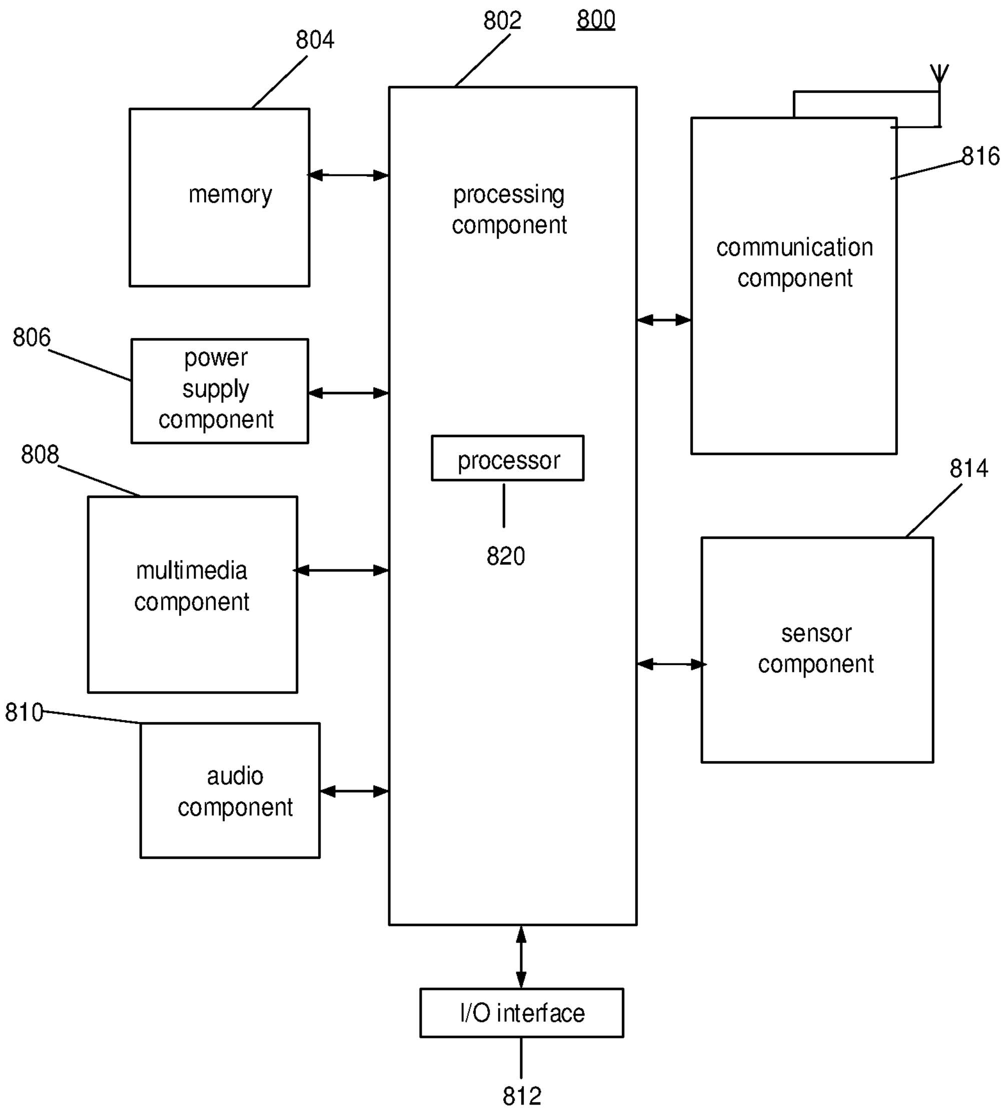
FIG. 8 is a block diagram illustrating a device for handing over to a relay UE according to an embodiment.

FIG. 8 is a block diagram illustrating a UE 800 according to an embodiment. For example, the UE 800 may be a mobile phone, a computer, a digital broadcast device, a messaging device, a game console, a tablet device, a medical device, a fitness device, a personal digital assistant, or the like.

As illustrated in FIG. 8, the UE 800 may include one or more of following components: processing component 802, memory 804, power supply component 806, multimedia component 808, audio component 810, input/output (I/O) interface 812, sensor component 814, and the communication component 816.

The processing component 802 generally controls the overall operations of the UE 800, such as operations associated with display, telephone calls, data communications, camera operations, and recording operations. The processing component 802 may include one or more processors 820 to execute instructions to complete all or part of the steps of the above methods. In addition, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support operations at the UE 800. Examples of such data include instructions for any application or method operating on the UE 800, contact data, phonebook data, messages, pictures, videos, and the like. The memory 804 can be implemented by any type of volatile or non-volatile storage device or their combination, such as static random access memory (SRAM), electrically erasable programmable read-only memory (EEPROM), erasable Programmable Read Only Memory (EPROM), Programmable Read Only Memory (PROM), Read Only Memory (ROM), Magnetic Memory, Flash Memory, Magnetic or Optical Disk.

The power supply component 806 provides power to various components of the UE 800. The power supply component 806 may include a power management system, one or more power supplies, and other components associated with generating, managing, and distributing power for the UE 800.

The multimedia component 808 includes a screen providing an output interface between the UE 800 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or swipe action, but also detect a duration and pressure associated with the touch or swipe operation. In some embodiments, the multimedia component 808 includes a front-facing camera and/or a rear-facing camera. When the UE 800 is in an operation mode, such as a shooting mode or a video mode, the front-facing camera and/or the rear-facing camera can receive external multimedia data. Each front-facing camera and rear-facing camera can be a fixed optical lens system or have focal length and optical zoom capability.

The audio component 810 is configured to output and/or input audio signals. For example, the audio component 810 includes a microphone (MIC), which is configured to receive external audio signals when the UE 800 is in operation modes, such as call mode, recording mode and voice recognition mode. Received audio signals may be further stored in the memory 804 or sent via the communication component 816. In some embodiments, the audio component 810 also includes a speaker for outputting audio signals.

The I/O interface 812 provides an interface between the processing component 802 and a peripheral interface module, which may be a keyboard, a click wheel, a button, and the like. These buttons may include, but are not limited to: home button, volume buttons, start button and lock button The sensor component 814 includes one or more sensors for providing the UE 800 with status assessments of various aspects. For example, the sensor component 814 can detect the open/closed state of the UE 800, the relative positioning of components, such as the display and keypad of the UE 800. The sensor component 814 can also detect the position change of the UE 800 or a component of the UE 800, the presence or absence of contact of the user with the UE 800, the orientation or acceleration/deceleration of the UE 800 and the temperature change of the UE 800. The sensor component 814 may include a proximity sensor configured to detect the presence of nearby objects in the absence of any physical contact. The sensor component 814 may also include an optical sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the UE 800 and other devices. The UE 800 can access a wireless network based on communication standards, such as WIFI, 2G or 3G, or a combination thereof. In an embodiment, the communication component 816 receives broadcast signals or broadcast related information from an external broadcast management system via a broadcast channel. In an embodiment, the communication component 816 also includes a near field communication (NFC) module to facilitate shortrange communication. For example, the NFC module may be implemented based on Radio Frequency Identification (RFID) technology, Infrared Data Association (IrDA) technology, Ultra-Wide Band (UWB) technology, Bluetooth (BT) technology and other technologies.

In an embodiment, the UE 800 may be powered by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation for performing the methods described above.

In an embodiment, there is also provided a non-transitory computer-readable storage medium including instructions, such as a memory 804 including instructions, which can be executed by the processor 820 of the UE 800 to perform the above methods. For example, the non-transitory computer readable storage medium may be ROM, random access memory (RAM), CD-ROM, magnetic tape, floppy disk, optical data storage device, and the like.

Figure 9:
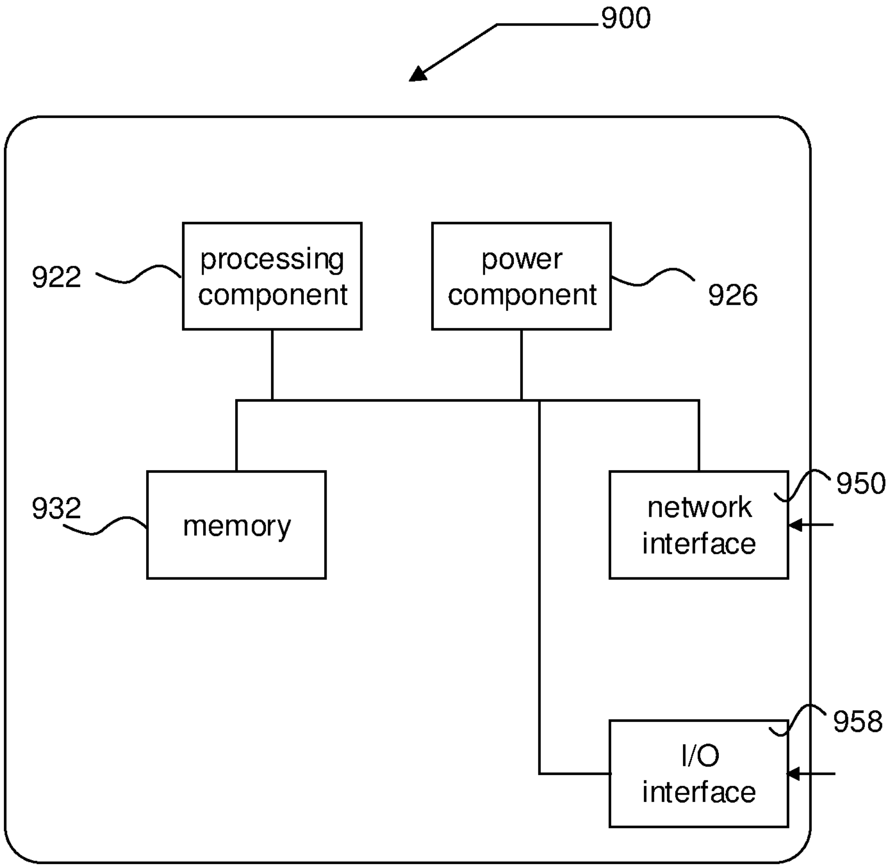
FIG. 9 is a block diagram illustrating a device for handing over to a relay UE according to an embodiment.

As illustrated in FIG. 9, a structure of a base station is illustrated in embodiments of the disclosure. For example, the base station 900 may be provided as a network side device. As illustrated in FIG. 9, the base station 900 includes a processing component 922, which further includes one or more processors, and a memory resource represented by memory 932 for storing instructions executable by the processing component 922, such as application programs. The application program stored in memory 932 may include one or more modules each corresponding to a set of instructions. In addition, the processing component 922 is configured to execute instructions, to perform any of the aforementioned methods performed by the base station.

The base station 900 may also include a power component 926 configured to perform power management of the base station 900, a wired or wireless network interface 950 configured to connect the base station 900 to a network, and an input-output (I/O) interface 958. The base station 900 can operate based on an operating system stored in the memory 932, such as Windows Server™, Mac OS X™, Unix™, Linux™, FreeBSD™ or the like.

When the remote UE knows that there is a need to hand over to a target relay UE, the remote UE determines whether to hand over to the target relay UE based on the serving cell of the remote target relay UE. That is, the serving cell of the target relay UE is used as a reference parameter for determining whether to perform the handover, to avoid a handover failure for the remote UE caused by a change of the serving cell of the relay UE, thereby improving the stability of the wireless communication system.

Other implementations of disclosed embodiments will be readily apparent to those skilled in the art from consideration of the specification and practice of the disclosure disclosed herein. This disclosure is intended to cover any modification, use or adaptation of embodiments of the disclosure, which follow the general principles of embodiments of the disclosure and include common knowledge in the technical field not disclosed in the disclosure or customary technical means. It is intended that the specification and examples be considered exemplary only, with a true scope and spirit of the disclosed embodiments being indicated by the following claims.

It is understandable that embodiments of the disclosure are not limited to the precise structures that have been described above and shown in the accompanying drawings, and various modifications and changes may be made without departing from the scope thereof. The scope of the disclosed embodiments is limited only by the appended claims.

INDUSTRIAL APPLICABILITY

When the remote UE knows that there is a need to hand over to a target relay UE, the remote UE determines whether to hand over to the target relay UE based on the serving cell of the remote target relay UE. The serving cell of the target relay UE is used as a reference parameter for determining whether to perform the handover, to avoid the handover failure of the remote UE caused by the change of the serving cell of the relay UE, thereby improving the stability of the wireless communication system.

What is claimed is:

1. A method for handing over to a relay user equipment (UE), performed by a remote UE, comprising:

determining whether to hand over to a target relay UE based on a serving cell of the target relay UE; and performing, in response to the serving cell of the target relay UE meeting a handover condition, the handover to the target relay UE, wherein the serving cell of the target relay UE meeting the handover condition comprises: the serving cell of the target relay UE being same as a reported serving cell of the target relay UE that has been reported by the remote UE to a network device.

2. The method of claim 1, wherein determining whether to hand over to the target relay UE based on the serving cell of the target relay UE comprises:

determining whether the serving cell of the target relay UE meets a handover condition in response to a trigger condition for a handover to the target relay UE being met.

3. The method of claim 2, wherein the trigger condition for the handover to the target relay UE comprises at least one of:

receiving, from the network device, a handover command for instructing the remote UE to perform the handover to the target relay UE; or determining, based on a parameter of a sidelink between the remote UE and the target relay UE, that a preset condition for handing over to the target relay UE is met; wherein the preset condition is received from the network device.

4. The method of claim 3, wherein, the parameter of the sidelink between the remote UE and the target relay UE comprises: channel quality of the sidelink between the remote UE and the target relay UE; and the preset condition for handing over to the target relay UE comprises:

the channel quality of the sidelink between the remote UE and the target relay UE being greater than a preset threshold.

5. The method of claim 1, further comprising:

not performing the handover to the target relay UE, in response to the handover condition not being met.

6. The method of claim 3, further comprising one of:

sending, to the network device, information for indicating that the remote UE does not hand over to the target relay UE;

initiating reestablishment of a radio resource control link to the target relay UE;

triggering a re-establishment request of the radio resource control link;

deleting the handover command corresponding to the target relay UE;

deleting a preset condition for handing over to the target relay UE; or deleting the handover command corresponding to the target relay UE and a preset condition for handing over to the target relay UE.

7. The method of claim 1, wherein before determining whether to hand over to the target relay UE based on the serving cell of the target relay UE, the method further comprises:

receiving, from the network device, a handover command for instructing the remote UE to perform the handover to the target relay UE.

8. A method for handing over to a relay user equipment (UE), performed by a network device, comprising:

sending a handover command to a remote UE for instructing the remote UE to hand over to a target relay UE, wherein the handover command is configured to trigger the remote UE to determine whether to hand over to the target relay UE based on a serving cell of the target relay UE, wherein the remote UE performs the handover to the target relay UE, in response to the serving cell of the target relay UE meeting a handover condition, wherein the serving cell of the target relay UE meeting the handover condition comprises: the serving cell of the target relay UE being same as a reported serving cell of the target relay UE that has been reported by the remote UE to the network device.

9. The method of claim 8, further comprising:

sending a cell list to the remote UE; wherein the cell list is used for enabling the remote UE to determine that the serving cell of the target relay UE meets the handover condition in response to the serving cell of the target relay UE belonging to the cell list and perform the handover to the target relay UE.

10. The method of claim 8, further comprising:

sending, to the remote UE, another handover command for instructing to hand over to a relay UE other than the target relay UE.

11. The method of claim 8, wherein the handover command is further configured to trigger the remote UE to perform, in response to the serving cell of the target relay UE does not meet the handover condition, one of:

sending, to the network device, information for indicating that the remote UE does not hand over to the target relay UE;

initiating reestablishment of a radio resource control link to the target relay UE;

triggering a re-establishment request of the radio resource control link;

deleting the handover command corresponding to the target relay UE;

deleting a preset condition for handing over to the target relay UE; or deleting the handover command corresponding to the target relay UE and a preset condition for handing over to the target relay UE.

12. The method of claim 11, further comprising:

receiving, from the remote UE, the information for indicating that the remote UE does not hand over to the target relay UE.

13. The method of claim 12, wherein the information for indicating that the target relay UE is not handed over to is determined by the remote UE based on a serving cell of the target relay UE.

14. The method of claim 12, wherein the information for indicating that the target relay UE is not handed over to is determined by the remote UE based on a determination that the serving cell of the target relay UE does not meet a handover condition in response to a trigger condition for a handover to the target relay UE being met.

15. A communication device, comprising:

a processor; and a memory storing processor-executable instructions;

wherein the processor is configured to:

determine whether to hand over to a target relay user equipment (UE) based on a serving cell of the target relay UE; and perform, in response to the serving cell of the target relay UE meeting a handover condition, the handover to the target relay UE, the serving cell of the target relay UE meeting the handover condition comprises: the serving cell of the target relay UE being same as a reported serving cell of the target relay UE that has been reported by a remote UE to a network device.

16. The communication device of claim 15, wherein the processor is further configured to:

determine whether the serving cell of the target relay UE meets a handover condition in response to a trigger condition for a handover to the target relay UE being met.

17. The communication device of claim 15, wherein the processor is further configured to:

not perform the handover to the target relay UE, in response to the handover condition not being met.

18. A communication device, comprising:

a processor; and a memory storing processor-executable instructions;

wherein the processor is configured claim 10.

19. A non-transitory computer-readable storage medium, having executable instructions stored thereon stored, wherein, when the executable instructions are executed by a processor, the method of claim 1 is performed.

20. A non-transitory computer-readable storage medium, having executable instructions stored thereon stored, wherein, when the executable instructions are executed by a processor, the method of claim 10 is performed.

* * * * *